(12) United States Patent
Guarin Aristizabal et al.

(10) Patent No.: US 11,079,471 B2
(45) Date of Patent: Aug. 3, 2021

(54) APPARATUS AND METHOD FOR CANCELLING INTERFERENCE SIGNALS

(71) Applicant: NXP USA, INC., Austin, TX (US)

(72) Inventors: Gustavo Guarin Aristizabal, Munich (DE); Ralf Reuter, Landshut (DE); Maik Brett, Taufkirchen (DE)

(73) Assignee: NXP USA, INC., Austin, TX (US)

(*) Notice: Subject to any disclaimer, the term of this patent is extended or adjusted under 35 U.S.C. 154(b) by 267 days.

(21) Appl. No.: 16/176,239

(22) Filed: Oct. 31, 2018

(65) Prior Publication Data

US 2019/0187245 A1 Jun. 20, 2019

(30) Foreign Application Priority Data

Dec. 18, 2017 (EP) .................................... 17208228

(51) Int. Cl.
| | |
|---|---|
| *G01S 13/93* | (2020.01) |
| *G01S 7/02* | (2006.01) |
| *G01S 13/931* | (2020.01) |
| *G01S 7/03* | (2006.01) |
| *H04B 1/525* | (2015.01) |
| *G01S 7/40* | (2006.01) |
| *G01S 7/288* | (2006.01) |
| *G01S 7/35* | (2006.01) |

(52) U.S. Cl.
CPC .............. *G01S 7/023* (2013.01); *G01S 7/038* (2013.01); *G01S 13/931* (2013.01); *H04B 1/525* (2013.01); *G01S 2007/2886* (2013.01); *G01S 2007/358* (2013.01); *G01S 2007/4065* (2013.01)

(58) Field of Classification Search
CPC .......... G01S 13/931; G01S 2007/2886; G01S 2007/358; G01S 2007/4065; G01S 7/023; G01S 7/038; H04B 1/525
See application file for complete search history.

(56) References Cited

U.S. PATENT DOCUMENTS

| | | | |
|---|---|---|---|
| 4,825,214 A * | 4/1989 | Dejaegher ............... | G01S 7/038 342/128 |
| 7,969,350 B2 | 6/2011 | Winstead et al. | |

(Continued)

OTHER PUBLICATIONS

Melzer, A., "On-Chip Delay Line for Extraction of Decorrelated Phase Noise in FMCW Radar Transceiver MMICs", Austrian Workshop on Microelectronics, IEEE 2015.

*Primary Examiner* — Timothy A Brainard

(57) ABSTRACT

A transceiver for a detection and ranging apparatus comprising:
a transmitter chain comprising a first sequence generator configured to generate a first signal based on a digital sequence;
an interference cancellation block comprising a second sequence generator configured to generate a second signal based on the same digital sequence used to generate the first signal, the second signal having a predetermined time delay relative to the first signal; and
the receiver chain configured to receive a received signal for detection and ranging, the received signal having components comprising at least none, one, or more reflections of the transmission signal and a component comprising an interference signal, the receiver chain comprising a first analog signal mixer configured to provide an output signal by mixing the received signal and the second signal thereby cancelling the interference signal in the received signal.

20 Claims, 3 Drawing Sheets

(56) References Cited

U.S. PATENT DOCUMENTS

| | | | |
|---|---|---|---|
| 9,841,498 B1* | 12/2017 | Campbell | G01S 13/343 |
| 9,887,862 B2* | 2/2018 | Zhou | H04L 25/08 |
| 2006/0273952 A1 | 12/2006 | Krikorian et al. | |
| 2009/0073029 A1* | 3/2009 | Nishijima | G01S 7/03 |
| | | | 342/200 |
| 2012/0293359 A1* | 11/2012 | Fukuda | G01S 13/64 |
| | | | 342/107 |
| 2013/0113646 A1* | 5/2013 | Allouche | G01S 13/885 |
| | | | 342/21 |
| 2016/0094331 A1* | 3/2016 | White | H04L 5/14 |
| | | | 370/278 |
| 2017/0199270 A1* | 7/2017 | Huemer | G01S 7/4021 |

* cited by examiner

APPARATUS AND METHOD FOR CANCELLING INTERFERENCE SIGNALS

CROSS-REFERENCE TO RELATED APPLICATIONS

This application claims the priority under 35 U.S.C. § 119 of European Patent application no. 17208228.1, filed on 18 Dec. 2017, the contents of which are incorporated by reference herein.

The present disclosure relates to a transceiver for detection and ranging, a corresponding automotive radar system and an automotive vehicle. It also relates to an associated method for performing detection and ranging.

According to a first aspect of the present disclosure there is provided a transceiver for a detection and ranging apparatus comprising: a transmitter chain comprising a first sequence generator configured to generate a first signal based on a digital sequence, the first signal for mixing with a carrier signal to provide a transmission signal; an interference cancellation block comprising a second sequence generator configured to generate a second signal based on the same digital sequence used to generate the first signal, the second signal having a predetermined time delay relative to the first signal wherein the predetermined time delay is characteristic of an interference signal expected to be received by a receiver chain of the transceiver; and the receiver chain configured to receive a received signal for detection and ranging, the received signal having components comprising at least none, one, or more reflections of the transmission signal and a component comprising the interference signal, the receiver chain comprising a first analog signal mixer configured to provide an output signal by mixing the received signal and the second signal thereby cancelling the interference signal in the received signal.

In one or more embodiments, the transmitter chain may further comprise a carrier signal generator and a second analog signal mixer, the carrier signal generator configured to generate the carrier signal and wherein the first signal is mixed with the carrier signal by the second analog signal mixer to provide the transmission signal.

In one or more embodiments, the carrier signal generator may comprise a local oscillator configured to generate a reference signal wherein the reference signal: (i) is generated at the carrier signal frequency, and so comprises the carrier signal; (ii) is generated at a frequency below the carrier signal frequency and the carrier signal generator means further comprises a frequency multiplier to increase the frequency of the reference signal to provide the carrier signal; or (iii) is generated at a frequency higher than the carrier signal frequency and the carrier signal generator means further comprises a frequency divider to decrease the frequency of the reference signal to provide the carrier signal.

In one or more embodiments, the digital sequence of the first signal may be generated by digital sequence logic, the digital sequence logic configured to receive a clock signal for generation of the digital sequence, the clock signal derived from one or more of the carrier signal generator; and a second local oscillator.

In one or more embodiments, the predetermined time delay may be characteristic of interference of the interference signal resulting from one or more of: (i) crosstalk between at least an antenna element of the transmitter chain configured to emit the transmission signal and at least an antenna element of the receiver chain configured to receive the received signal; and (ii) a known obstacle mounted in a fixed spatial relationship with the transceiver.

In one or more embodiments, the receiver chain may comprise a third analog signal mixer arranged upstream of the first analog signal mixer, the third analog signal mixer configured to downconvert the received signal by mixing the received signal and the carrier signal prior to mixing of the received signal with the second signal.

In one or more embodiments, the receiver chain may comprise a track and hold amplifier and an analog to digital converter (ADC), the ADC downstream of the track and hold amplifier, the track and hold amplifier and the ADC arranged downstream of the first analog signal mixer and configured to digitise the output signal of the first analog signal mixer.

In one or more embodiments, the track and hold amplifier may be driven by the clock signal.

In one or more embodiments, the transceiver may further comprise a fractional divider configured to reduce the frequency of the clock signal by an integer factor k to provide a subsample clock signal and wherein the track and hold amplifier is driven by the subsample clock signal In one or more embodiments, the receiver chain may comprise a coherent adder arranged after the ADC and configured to average the output signal of the first analog signal mixer after digitisation of the output signal.

In one or more embodiments, the carrier signal may be modulated by at least one of phase, frequency and amplitude modulation based on the digital sequence of the first signal.

In one or more embodiments, the carrier signal may be modulated by BPSK, n-QPSK or n-QAM modulation.

In one or more embodiments, the interference cancellation block may be configured to provide the second signal with a predetermined attenuated amplitude with respect to the first signal, wherein the predetermined attenuated amplitude is characteristic of the amplitude of the interference signal expected to be received by the receiver chain.

In one or more embodiments, the interference cancellation block may further comprise a third sequence generator configured to generate a third signal based on the same digital sequence used to generate the first signal, the third signal having a second predetermined time delay relative to the first signal, the second predetermined time delay characteristic of a second interference signal expected to be received by the receiver chain, wherein the second predetermined time delay is different to the first predetermined time delay and wherein receiver chain is configured to use the third signal to provide for cancelling of the second interference signal in the received signal.

In one or more embodiments, the interference cancellation block may be configured to provide the third signal with a second predetermined attenuated amplitude with respect to the first signal, wherein the second predetermined amplitude is characteristic of the amplitude of the second interference signal expected to be received by the receiver chain.

In one or more embodiments, the receiver chain includes a fourth analog signal mixer configured to mix the third signal with the received signal to thereby provide for cancelling of the second interference signal in the received signal.

In one or more embodiments, the fourth analog signal mixer may be arranged downstream of the third analog signal mixer.

In one or more embodiments, the interference cancellation block may further comprise an integrated circuit configured to combine the second signal and the third signal such that cancelling of the interference signal and the second interference signal is provided for by the third analog signal mixer.

In one or more embodiments, the transceiver may comprise a plurality of transmitter chains, a corresponding plurality of interference cancellation blocks and a corresponding plurality of receiver chains, each transmitter chain configured to generate a transmission signal having an orthogonal digital signal to the transmission signals generated by the other transmitter chains, the transceiver thereby providing for a multi-in multi-out system.

In one or more embodiments, each of the plurality of receiver chains is configured to provide for analysis of the received signals resulting from each of the plurality of transmitter chains.

According to a second aspect of the present disclosure, there is provided a method of cancelling an interference signal for a detection and ranging system comprising: generating a first signal based on a digital sequence, the first signal for mixing with a carrier signal to provide a transmission signal; generating a second signal based on the same digital sequence used to generate the first signal, the second signal having a predetermined time delay relative to the first signal wherein the predetermined time delay is characteristic of an interference signal expected to be received by the detection and ranging system; receiving a received signal for detection and ranging, the received signal having components comprising at least none, one, or more reflections of the transmission signal and a component comprising the interference signal; and providing an output signal by mixing the received signal and the second signal thereby cancelling the interference signal in the received signal.

In one or more embodiments, the method may comprise the steps of: generating the carrier signal; and mixing the first signal with the carrier signal to provide the transmission signal.

In one or more embodiments, the method may further comprise the step of downconverting the received signal by mixing the received signal and the carrier signal prior to mixing of the received signal with the second signal.

In one or more embodiments, the method may further comprise the step of digitising the output signal after the step of mixing the received signal with the second signal.

In one or more embodiments, the method may further comprise the step of averaging the output signal after digitisation of the output signal.

In one or more embodiments, the method may further comprise the steps of generating a third signal based on the same digital sequence used to generate the first signal, the third signal having a second predetermined time delay relative to the first signal, the second predetermined time delay characteristic of a second interference signal expected to be received by the receiver chain, wherein the second predetermined time delay is different to the first predetermined time delay; and providing the output signal by mixing the received signal and the third signal, thereby cancelling the second interference signal in the received signal using the third signal.

According to a third aspect of the present disclosure, there is provided an automotive radar system comprising the transceiver of the first aspect.

According to a fourth aspect of the present disclosure, there is provided a vehicle comprising the automotive radar system of the third aspect.

According to a fifth aspect of the present disclosure, there is provided a computer readable medium comprising instructions for carrying out the steps of the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Radar systems are becoming increasingly common in the automotive industry. These systems are used, for example, as sensors for assisted parking, automatic cruise control speed adjustment (adaptive cruise control), headway alert, collision warning and mitigation and brake support. Example embodiments are described that provide for an advantageous transceiver configured to provide for cancellation of interference signals expected to be received by a receiver chain of the transceiver.

Radar (originally an acronym, RADAR) stands for Radio Detection And Ranging. While radar technology was originally directed towards the use of radio frequency electromagnetic waves for detection and ranging, this term is now often used generically for electromagnetic waves of any frequency that are used for detection and ranging purposes.

A radar system may perform detection and ranging by transmitting an electromagnetic wave, such as a pulse, from a transmitter antenna and measuring the time taken for the reflected signal to be detected at a receiver antenna. The amount of time taken for a reflected signal to reach an obstacle and be reflected back provides an indication of the range of that obstacle from the radar system. By using a series of pulses or a continuous wave mode of operation (such as a frequency-modulated continuous wave radar system), a time-resolved range profile of a space around a radar system may be obtained. It will be appreciated that any action which includes the ranging of a remote object will inherently include the action of detecting said remote object.

In a radar system, the receiver can be saturated due to strong reflections, such as by crosstalk or Radom reflection. This may, in some cases, be solved by decreasing the gain at the receiver, however, this may reduce the dynamic range of the system and will degrade the capacity of the radar to detect long range weak (small) targets. Alternatively, in the case of self-interferences (which commonly result in strong reflections), a version of the generated radar signal may be delayed with a delay line and/or attenuated in order to be subtracted from the received signal. Nevertheless, this technique requires the design of programmable delay lines (to compensate for reflections coming from variable targets) which typically require a large amount of substrate area to implement on the radar system. In addition, ultra-wide-band (UWB) delay lines have to be designed for UWB radar systems, which represents a challenge in terms of design. It may be advantageous to design a radar system which does not require the use of one or more programmable delay lines.

In the present disclosure, a transceiver is disclosed which is configured to provide for cancelling of expected interference signals.

Figure 1:
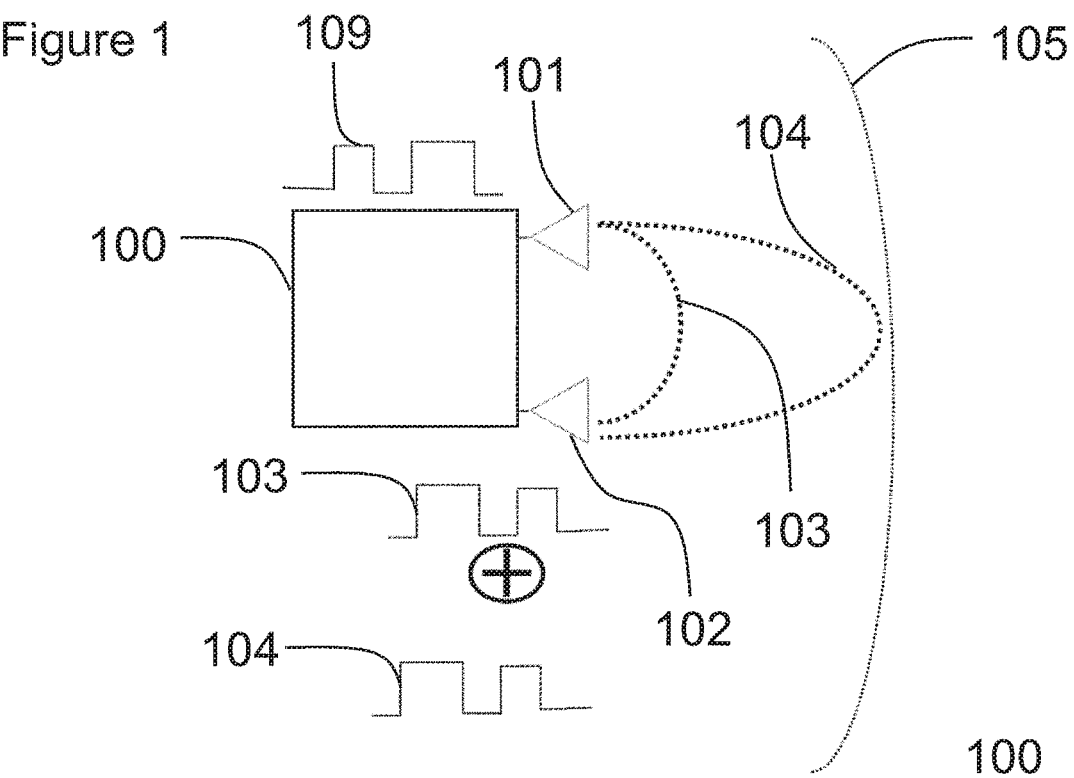
FIG. 1 shows an example embodiment of a transmitter antenna, a receiver antenna and the interference signals which may arise during the operation thereof.

FIG. 1 shows an example of a transceiver 100 comprising a transmitter antenna 101, a receiver antenna 102, and examples of the interference signals 103, 104 which may arise for such a transceiver 100. The transceiver 100 may comprise a transmitter chain configured to generate a transmission signal 109 and transmit said transmission signal 109 via the transmitter antenna 101. The receiver antenna 102 may be configured to receive signals collectively referred to herein as a received signal. The received signal is processed by a receiver chain which comprises a portion of the transceiver 100. The received signal may comprise none, one, or more components which correspond to reflections of the transmission signal 109 from remote objects (depending on whether or not remote objects are present). In the case of an automotive radar system, the remote objects may be the road, other vehicles, a cyclist, an animal or a pedestrian. The received signal may also comprise one or more expected interference signals 103, 104.

Expected interference signals may arise, for example, as a result of inadequate isolation between a transmitter antenna 101 and a receiver antenna 102, thereby resulting in a crosstalk interference signal 103 between these components. Such interference may provide for a strong signal component in the received signal which does not assist with detection and ranging but does contribute to the saturation of the receiver chain. Alternatively, interference signals may also arise from reflections from obstacles 105 arranged at a fixed spatial relationship with the transceiver, thereby providing fixed obstacle interference signals 104. Such fixed obstacles 105 may comprise the casing of the transceiver 100 or, in the case of a transceiver 100 for an automotive radar system, may comprise the bumper of a car or another portion of the vehicle from which reflections may arise. In the case of interference signals arising from fixed obstacles 105, these interference signals do not provide information which is useful to a radar system but, due to their proximity to the transceiver 100, may provide strong signals which also contribute so to saturation of the receiver chain. An analog to digital converter of the receiver chain may be susceptible to saturation. It will be appreciated that one or more components may be saturated.

Figure 2:
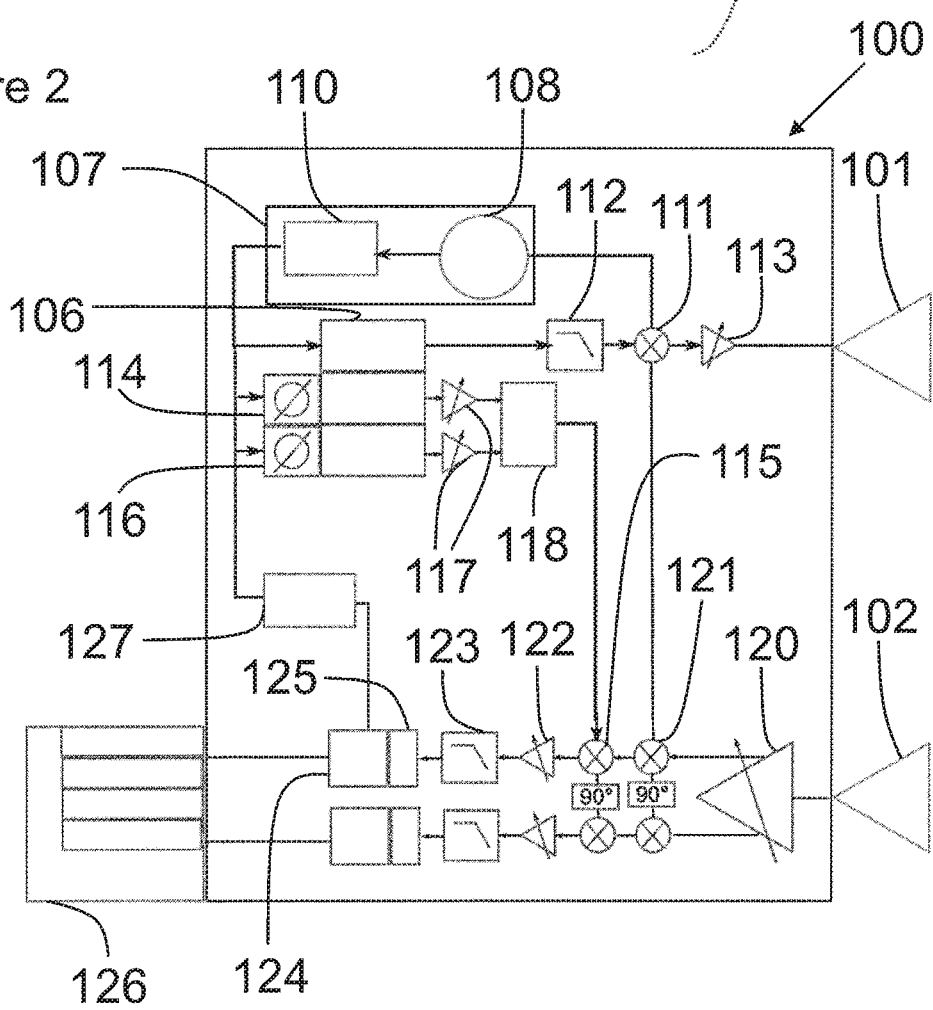
FIG. 2 shows an example embodiment of a block diagram of a transceiver.

FIG. 2 shows an example block diagram of a transceiver 100 for providing the cancelling described herein. In the example of FIG. 2, a sequence generator 106 is shown which is configured to generate a first signal comprising a digital sequence. It will be appreciated that the first signal may not comprise a perfect representation of the digital sequence and may include one or more noise components or other distortions to its waveform.

The first signal may be generated by a first sequence generator 106 which comprises digital sequence logic, the digital sequence logic configured to receive a clock signal for generation of the digital sequence. The digital sequence logic may be controlled by software configured to cause the digital sequence logic to produce a digital sequence signal suitable for detection and ranging. The digital sequence may be a binary signal, such as Binary Phase Shift-Key modulated (BPSK) or a signal with a higher constellation of values, such as n-Quadrature Phases Shift-Key modulated (n-QPSK) or n-Quadrature Amplitude Modulation (n-QAM).

A local oscillator 108 is provided for generating a reference signal. The reference signal may, in one or more examples, be used for generating a carrier signal. Accordingly, the local oscillator 108 may be considered to be a carrier signal generator. The first signal is configured to modulate the carrier signal to provide the transmission signal 109 for performing the detection and ranging. The reference signal may be at a desired carrier frequency and therefore may comprise the carrier signal. Alternatively, the reference signal may be at a frequency higher or lower than the desired carrier frequency. In this case, the carrier signal generator 107 may comprise one or more frequency multipliers or frequency dividers configured to bring the frequency of the reference signal to the desired carrier frequency.

The reference signal may also be used to provide a clock signal for controlling the digital sequence logic. The local oscillator 108 may be configured to generate the reference signal at a frequency suitable for controlling the digital sequence logic, in this instance, the reference signal provides the clock signal. Alternatively, if the reference signal is generated at a frequency lower or higher than the desired clock signal frequency, then one or more frequency multipliers or frequency dividers 110 may be provided in order to bring the reference signal to the desired clock signal frequency. In another embodiment, a second local oscillator, different to the local oscillator 108 used to provide for generation of the carrier signal, may be provided which generates the clock signal. By way of example, the digital clock signal may have a frequency between 0.1-10 GHz.

In the example of FIG. 2, a single local oscillator 108 is provided which generates the reference signal at the required frequency to provide the carrier signal, such as at 77 GHz. In order to provide the clock signal, the reference signal is provided to a frequency divider 110 which thereby reduces the frequency of the reference signal to a frequency appropriate to provide the clock signal.

The first signal is mixed, by a second analog signal mixer 111, with the carrier signal in order to provide for generation of the transmission signal 109. The first signal is thus upconverted to a desired transmission signal frequency. The transceiver 100 may comprise a filter 112. The filter 112 may be configured prior to the mixing of the first signal with the carrier signal, filtering of the first signal in order to remove high frequency noise. The transmission signal frequency may be any frequency suitable for performing detection and ranging. In some examples, the transmission frequency may be a frequency between 60 and 90 GHz. In other examples, the transmission frequency may be 77 GHz. The transmission signal may be emitted by a transmitter antenna 101. The mixing of the carrier signal with the first signal may result in the modulation of the carrier signal by one or more of phase modulation, frequency modulation or amplitude modulation. The transceiver 100 may include a power amplifier. Prior to transmission by a transmitter antenna 101, the transmission signal may be amplified using the power amplifier 113. It will be appreciated that the transceiver 100 comprises a receiver chain and a transmitter chain which may be configured to couple to a common antenna or may be coupled to a separate transmitter antenna 101 and receiver antenna 102 that are connected to the transceiver 100 for operation thereof. that are connected to the transceiver 100 for operation thereof.

The transceiver 100 further comprises an interference cancellation block which comprises a second sequence generator 114 configured to generate a second signal comprising the same digital sequence used to generate the first digital sequence. It will be appreciated that the second signal may not comprise a perfect representation of the digital sequence and may include one or more noise components or other distortions to its waveform. The second signal may have substantially the same waveform as the first signal except that the second signal comprises a predetermined time delay relative to the first signal. In addition, the second signal may also comprise a predetermined attenuated amplitude with respect to the amplitude of the first signal. It will be appreciated that the effects of noise signals and other distortions may prevent the first and second signals from having precisely the same waveforms, however, both first and second signals are at least based on the same digital sequence such that their waveforms are similar enough to provide for cancelling of the interference signal in a received signal.

The predetermined time delay of the second signal is characteristic of an interference signal expected to be received by a receiver chain of the transceiver 100, i.e. the predetermined time delay corresponds to the time delay expected between the emission of the transmission signal and the receipt of the expected interference signal by the receiver chain.

The predetermined attenuated amplitude of the second signal may be characteristic of an interference signal expected to be received by a receiver chain of the transceiver 100, i.e. the predetermined attenuated amplitude may correspond to the amount of attenuation expected to occur between emission of the transmission signal and receipt of the expected interference signal by the receiver chain. For example, the amount of attenuation may be larger for reflections from fixed obstacles located further away from the transceiver as compared to those which are closer to the transceiver.

As shown in FIG. 2, the receiver chain may comprise an in-phase/quadrature (I/Q) receiver amplifier 120 which separates the received signal into a two-channel signal provided over an in-phase component receiver chain part and a quadrature component receiver chain part, wherein the quadrature signal is 90 degrees out of phase from the in-phase signal. By providing for an I/Q receiver amplifier and in-phase and quadrature component receiver chain parts, the phase of the received signal may be calculated by the DSP. The receiver chain may comprise a first analog signal mixer 115 configured to provide for cancelling of the interference signal in the received signal based on receipt of the received signal and the second signal. The first analog signal mixer 115 may be configured to provide for destructive mixing of the second signal with the received signal, such that the process of mixing results in the cancelling of the interference signal component from the received signal to provide an output signal. In some examples, the second signal may be passed through an inverter prior to mixing with the first analog signal mixer. It will be appreciated that, due to noise or distortions in the waveform of either the received signal or the second signal, the interference signal may not be cancelled entirely, however, a reduction in the intensity of the interference signal may be achieved which will advantageously reduce the likelihood of receiver saturation.

As discussed earlier, more than a single interference signal may be expected to be present in a received signal for a given transceiver 100. As a result of this, there may be provided a third sequence generator 116 configured to generate a third signal based on the same digital sequence used to generate the first signal. The third digital signal may have a second predetermined time delay relative to the first signal, the second predetermined time delay characteristic of a second interference signal expected to be received by the receiver chain. The second predetermined time delay may be different to the first predetermined time delay of the second signal. For example, the second predetermined time delay of the second signal may be characteristic of crosstalk between the transmitter antenna 101 and the receiver antenna 102, The second characteristic time delay of the third signal may be characteristic of the time delay of a transmission signal reflected from the bumper of a car on which the transceiver is mounted. In addition, the third signal may further comprise a second predetermined attenuated amplitude with respect to the first signal. The second predetermined amplitude may be characteristic of the second interference signal expected to be received by the receiver chain. The third signal may be used to provide for cancelling of the second interference signal in the received signal.

In this example, the predetermined delay of the second signal (and/or the second predetermined delay of the third signal) with respect to the first signal is provided by delaying the application of the clock signal to the digital sequence logic of the second (and/or third) signal generator. The delay may be provided by a phase rotator, such as a small bandwidth phase rotator. Thus, the generation of the digital sequence of the second signal is delayed instead of a portion of the first signal being delayed by an analog delay line in order to provide the second signal. Delaying a portion of the first signal to provide the second signal using an analog delay line, or other component for delaying the first signal, may require components which take up space in a transceiver. In contrast, generating a second signal independent of the first signal but using the same digital sequence logic may provide for a more space-efficient transceiver.

FIG. 2 shows an example wherein the amplitudes of the second and third signals are altered by power amplifiers 117 and then combined by an integrated circuit 118. The combined second and third signals can then be destructively mixed with the received signal using the first analog signal mixer 115 in order to provide for cancelling of both the first and second interference signals. In one or more examples, an integrated circuit 118 may not be used to mix the second and third signals but, instead, a fourth analog signal mixer may be provided which is configured to destructively mix the second interference signal with the received signal. The fourth analogue signal mixer may be arranged after the third signal mixer or before the first analog signal mixer 115 in the receiver chain.

It will be further understood that one or more of additional sequence generators may be arranged in order to provide for cancelling of any corresponding number of expected interference signals having expected predetermined time delays. As above, these signals may be combined using an integrated circuit 118 and cancelling may be provided for by the first analog signal mixer 115. Alternatively, a corresponding number of additional analog signal mixers may be provided in the receiver chain in order to provide for cancelling of the interference signals.

The receiver chain further comprises a third analog signal mixer 121 configured to downconvert the received signal by mixing the received signal and the carrier signal in order to provide for downconversion to baseband. The third analog signal mixer 121 may be arranged before or upstream of the first analog signal mixer 115 such that the received signal is downconverted to baseband prior to providing for cancelling of the interference signal or interference signals.

The receiver chain may comprise one or more receiver chain power amplifiers 122 and one or more receiver chain low pass filters 123. Both the one or more receiver chain power amplifiers 122 and the one or more receiver chain low pass filters 123 may be downstream of the first analog signal mixer. After cancelling of the interference signal or interference signals, the one or more of the receiver chain power amplifiers 122 may be configured to amplify the output signal. The one or more of the receiver chain low pass filters 123 may be configured to remove high frequency signal components from the output signal. The one or more of the receiver chain low pass filters 123 may be arranged upstream or downstream of the receiver chain power amplifiers 122. The receiver chain may further comprise an analog to digital converter (ADC) 124 and a track-and-hold amplifier 125 downstream of the first analog signal mixer. The ADC 124 and the track and hold amplifier 125 may be configured to digitise the output signal. The digitisation may be performed with an effective sampling frequency of at least twice the bandwidth of the signal. The track and hold amplifier 125 may be configured to be driven by the clock signal, or the clock signal may be divided by an integer factor, k, by a fractional divider 127 in order to provide a subsample clock signal which drives the track and hold amplifier. The fractional divider 127 may be downstream of the carrier signal generator and may be configured to divide the clock signal by the integer factor, k. By using a subsample clock signal, the output signal may be sampled during digitisation with an instantaneous sampling frequency lower than that indicated by the Nyquist theorem but the signal will be repeated k times in order to sample a part of the signal in every repetition. Thus, by using a subsample clock signal during digitisation, a low speed analog to digital converter 124 may be used to sample a signal with an Ultra-Wide Band (UWB) bandwidth, however, in this case, the track and hold amplifier 125 may comprise an input bandwidth equal to the bandwidth of the UWB signal to be digitised.

It will be appreciated, as shown in FIG. 2, that each of the in-phase component receiver chain part and the quadrature component receiver chain part of the receiver chain comprise the same components as those described until they are received by a Digital Signal Processor (DSP) 126.

The receiver chain may comprise a Digital Signal Processor (DSP) 126 downstream of the ADC 124. Alternatively, the DSP may comprise part of an automotive radar system which comprises the transceiver, wherein the transceiver and the DSP in communication within the automotive radar system. The DSP may be configured to process the output signal after it has been digitised. The DSP 126 may comprise a coherent adder configured to average the output signal in order to increase the Signal-to-Noise Ratio (SNR) of the system. The signal may also be cross correlated with the digital sequence on which the first signal and the second signal are based in order to provide for further improved SNR. A radar system using cross correlation maybe more robust against other sources of interference than a radar system which does not employ cross correlation. It will be appreciated that the DSP 126 may be implemented by computer software configured to perform the relevant processes or by appropriate hardware implementations.

Figure 3:
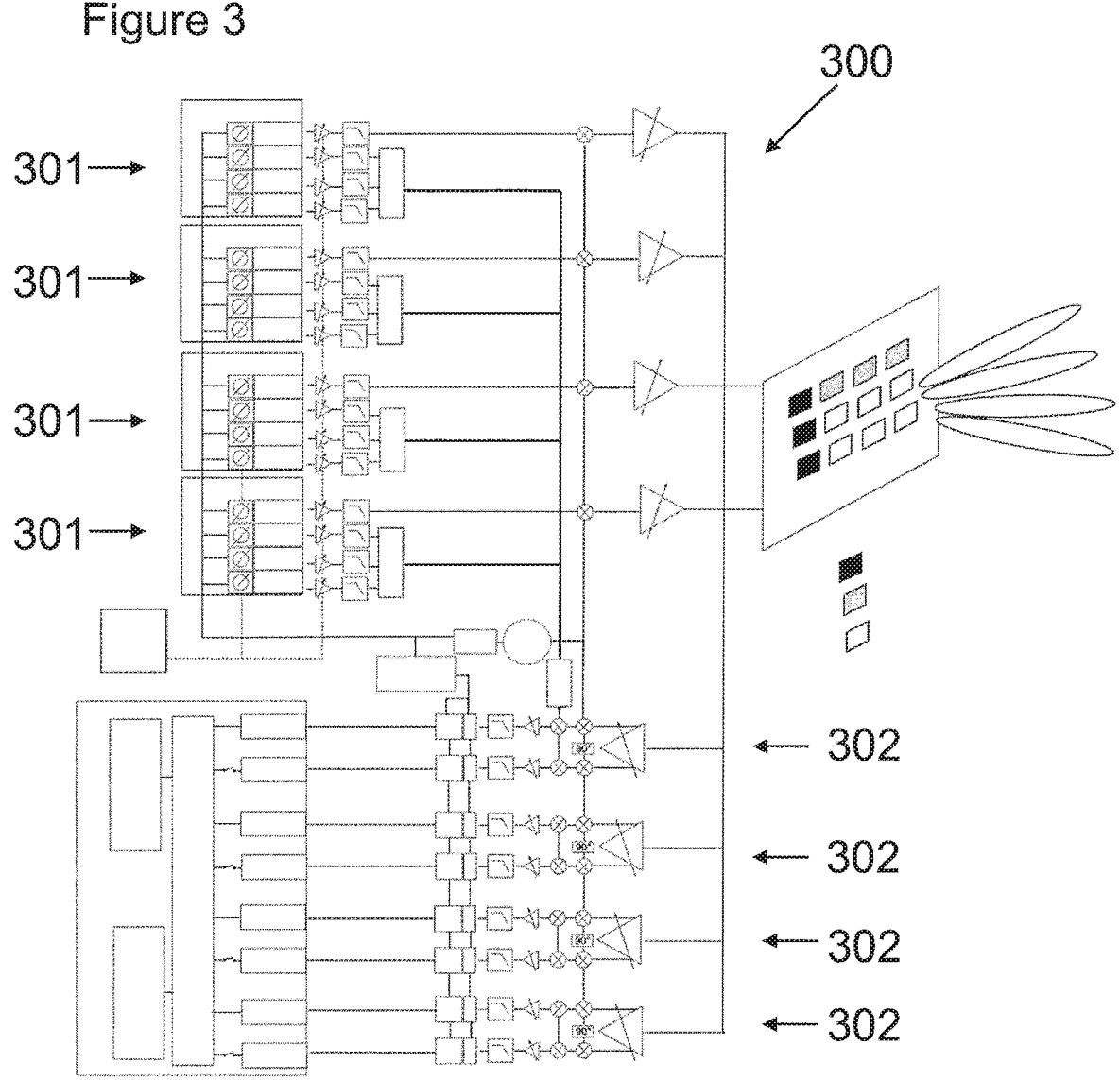
FIG. 3 shows an example embodiment of a block diagram of a transceiver comprising multi-in multi-out system.

FIG. 3 shows an example embodiment of a transceiver 300, wherein the transceiver comprises a plurality of transmitter chains 301, as described above. Each of the transmitter chains receive a carrier signal for mixing with the first signal of each transmitter chain of the plurality of transmitter chains from a local oscillator acting as a common carrier signal generator. It will be appreciated that, alternatively, each transmitter chain may receive a carrier signal from a separate carrier signal generator. In addition, the clock signal is also generated by the local oscillator and a frequency divider 310 is employed in order to provide the clock signal at a frequency appropriate for driving the digital sequence logic of the first, second and/or third signal generators. Each transmitter chain of the plurality of transmitter chains is configured to generate a transmission signal having an orthogonal digital sequence to the transmission signals generated by the other transmitter chains. As shown in FIG. 3, for each of the plurality of transmitter chains, there may be provided a corresponding plurality of interference cancellation blocks and a corresponding plurality of receiver chains 302. By providing for a plurality of orthogonal transmission signals, the transceiver is able to provide for a multi-in multi-out system (MIMO) wherein each of the transmitter chains 301 are capable of operating simultaneously.

A corresponding plurality of transmitter antennas may be arranged to emit the transmission signal and a corresponding plurality of receiver antennas may be arranged to receive the received signals, thereby providing for a transceiver capable of performing MIMO analysis. In a MIMO system comprising M transmitter antennas and N receiver antennas, a virtual antenna array with M multiplied by N (M*N) non-overlapped virtual transmitter chain/receiver chain pairs may provide for additional angular resolution in the detection and ranging. The virtual array may be provided for by, for each of the plurality of receiver chains, providing for analysis of the received signals resulting from each of the transmitter chains. It is possible to provide for additional angular information, i.e. a steering vector, because the distance between each transmitter chain and each receiver chain is known.

Figure 4:
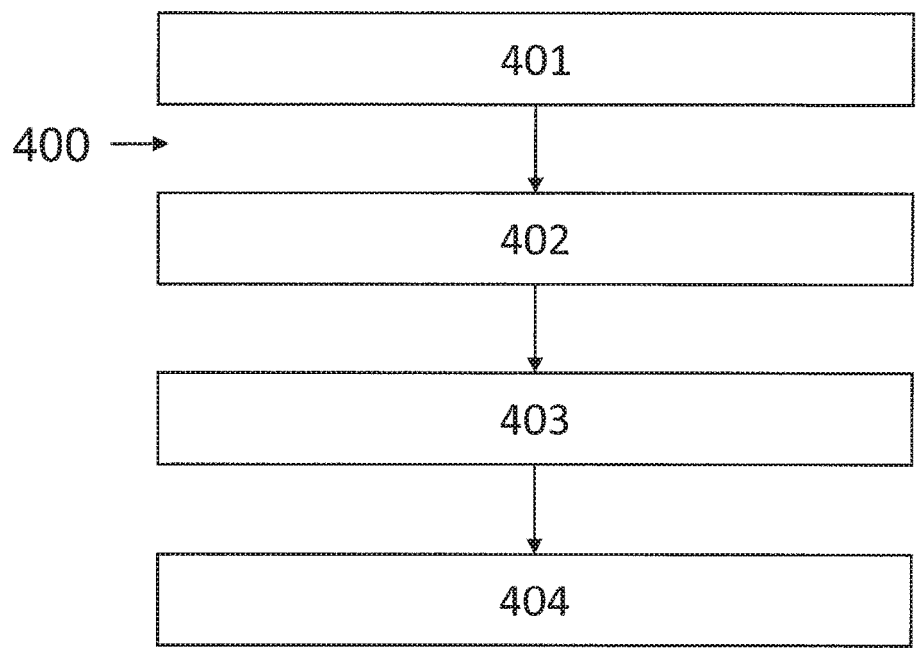
FIG. 4 shows an example embodiment of a method of the present disclosure.

FIG. 4 shows an example method 400 of cancelling an interference signal for a detection and ranging system according to the present disclosure. The method comprises the step of generating 401 a first signal based on a digital sequence, such as by driving digital sequence logic using a clock signal. Alternative methods for generating a signal based on a digital signal may also be used. The first signal may be configured to be mixed with a carrier signal in order to provide a transmission signal. It will be appreciated that an electronic component other than the transceiver 100, 300 may carry out the step of mixing the carrier signal with the first signal or this step may be performed by the transceiver 100, 300. The method further comprises the step of generating 402 a second signal based on the same digital sequence used to generate the first signal, the second signal having a predetermined time delay relative to the first signal. The second signal may also be generated by using a clock signal to drive digital sequence logic different from the digital sequence logic used to generate the first signal. The predetermined time delay is characteristic of an interference signal expected to be received by the detection and ranging system, such as interference signals arising from crosstalk between a transmitter antenna and a receiver antenna or reflection from a known object mounted at a fixed spatial distance from the transceiver. The details of the predetermined time delay, and any additional predetermined time delays for additional interference signals, may be known to the apparatus and stored therein or may be derived based on a calibration process. stored in a computer readable medium. A calibration process may comprise operating the transceiver in the absence of remote objects which may be detected by the automotive radar or by operating the transceiver in an environment where the only remote objects at a known distance and of a known size are present. In either of these situations, any components of the received signal (other than those of known remote objects) may be considered to be interference signals and details of these interference signals, such as their delay times and their amplitudes may be stored by the transceiver to be used as predetermined delay times and predetermined amplitudes. The step of generating the second signal based on the same digital sequence used to generate the first signal may be performed after the generation of a first signal, the difference in time between the generation of these signals being equal to the predetermined time delay. In order to delay the generation of the second signal, the clock signal is delayed from driving the digital sequence logic of the second signal generator by a phase rotator. By delaying the generation of the second signal, an analog delay line is not required, which may provide for advantageous space saving in the transceiver. The method further comprises the step of receiving 403 a received signal for detection and ranging, the received signal having components comprising at least none, one, or more reflections of the transmission signal and a component comprising the interference signal. The components comprising at least one or more reflections of the transmission signal may comprise signals of interest, such as remote objects which are not fixed spatially relative to the transceiver. In the example of an automotive radar system, these remote objects may comprise the road, other vehicles, a cyclist, an animal or a pedestrian. Finally, the method comprises the step of providing 404 an output signal by mixing the received signal and the second signal thereby cancelling the interference signal in the received signal.

The method may further comprise the steps of generating the carrier signal and mixing the first signal with the carrier signal to provide the transmission signal. It will be appreciated that the step of generating the carrier signal and/or mixing the first signal with the carrier signal to provide the transmission signal may be performed by a component other than the transceiver. The method may also comprise the step of downconverting the received signal by mixing the received signal and the carrier signal prior to mixing of the received signal with the second signal. Alternatively, the second signal may be upconverted to the frequency of the received signal, such as using the carrier signal with a corresponding time delay, and then used for providing for cancelling of the interference signal on the received signal prior to the step of downconverting the received signal. This approach may require at least one additional analog signal mixer to upconvert the second signal prior to mixing with the received signal.

The method may comprise the step of digitising the output signal after the step of mixing the received signal with the second signal. Subsequent to digitising the output signal may be the step of averaging the output signal.

The method may further comprise the step of generating a third signal based on the same digital sequence used to generate the first signal. The generation of the third signal may be performed with a predetermined time delay relative to the first signal, the second predetermined time delay being characteristic of a second interference signal expected to be received by the receiver chain and the second predetermined time delay being different from the first predetermined time delay. Provision may be made for cancellation of the second interference signal in the received signal using the third signal. For example, cancellation may be provided for by mixing the third signal with the received signal either before or after mixing with the second signal. Alternatively, the second and third signals may be combined and then mixed with the received signal in order to provide for simultaneous cancelling of both the first interference signal and the second interference signal.

Figure 5:
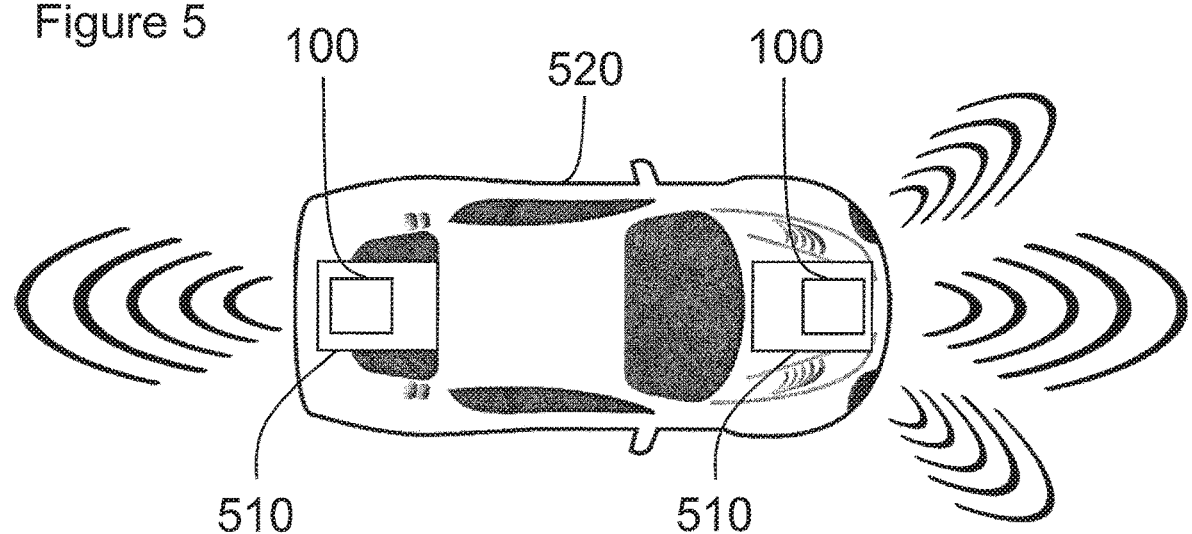
FIG. 5 shows an example embodiment of an automotive vehicle comprising an automotive radar system.

FIG. 5 shows an automotive radar system 510 comprising a transceiver 100 as disclosed herein. It will be appreciated that some features described above may comprise a part of the transceiver 100 or, for example, the automotive radar system 510. For example, the apparatus required to digitise the output signal may comprise a portion of the automotive radar system 510 or the transceiver 100, Information regarding the predetermined time delays or predetermined amplitudes may be stored on a computer readable medium comprising a part of the automotive radar system, the transceiver, or elsewhere such as on a remote server.

FIG. 5 also shows an automotive vehicle 520 that comprises the automotive radar system 510 which, in turn, comprises the transceiver 100. The automobile 520 may comprise a car, a self-driving car, a truck, a lorry, a van, a caravan, a motorbike, a utility vehicle, a boat, a ship, a drone, an aircraft or an emergency services vehicle. In some embodiments, the transceiver may be in communication with an automatic braking system or other driver assistance system of the vehicle.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments, the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver for a detection and ranging apparatus comprising:
   a transmitter chain comprising a first sequence generator configured to generate a first signal based on a digital sequence, the first signal for mixing with a carrier signal to provide a transmission signal;
   an interference cancellation block comprising a second sequence generator configured to generate a second signal based on the same digital sequence used to generate the first signal, the second signal having a predetermined time delay relative to the first signal wherein the predetermined time delay is characteristic of an interference signal expected to be received by a receiver chain of the transceiver; and
   the receiver chain configured to receive a received signal for detection and ranging, the received signal having components comprising at least none, one, or more reflections of the transmission signal and a component comprising the interference signal, the receiver chain comprising a first analog signal mixer configured to provide an output signal by mixing the received signal and the second signal thereby cancelling the interference signal in the received signal.

2. The transceiver of claim 1 wherein the transmitter chain further comprises a carrier signal generator and a second analog signal mixer, the carrier signal generator configured to generate the carrier signal and wherein the first signal is mixed with the carrier signal by the second analog signal mixer to provide the transmission signal.

3. The transceiver of claim 1, wherein the predetermined time delay is characteristic of an interference signal resulting from one or more of:
   (i) crosstalk between at least an antenna element of the transmitter chain configured to emit the transmission signal and at least an antenna element of the receiver chain configured to receive the received signal; and
   (ii) a known obstacle mounted in a fixed spatial relationship with the transceiver.

4. The transceiver of claim 1, wherein the receiver chain comprises another analog signal mixer arranged upstream of the first analog signal mixer, the another analog signal mixer configured to downconvert the received signal by mixing the received signal and the carrier signal prior to mixing of the received signal with the second signal.

5. The transceiver of claim 1, wherein the receiver chain comprises a track and hold amplifier and an analog to digital converter, the analog to digital converter downstream of the track and hold amplifier, the track and hold amplifier and the analog to digital converter arranged downstream of the first analog signal mixer and configured to digitise the output signal of the first analog signal mixer.

6. The transceiver of claim 5 wherein the receiver chain comprises a coherent adder arranged after the ADC and configured to average the output signal after digitisation of the output signal.

7. The transceiver of claim 1, wherein the carrier signal is modulated by at least one of phase, frequency and amplitude modulation based on the digital sequence of the first signal.

8. The transceiver of claim 1, wherein the interference cancellation block is configured to provide the second signal with a predetermined attenuated amplitude with respect to the amplitude of the first signal, wherein the predetermined attenuated amplitude is characteristic of the interference signal expected to be received by the receiver chain.

9. The transceiver of claim 1, wherein the interference cancellation block further comprises a third sequence generator configured to generate a third signal based on the same digital sequence used to generate the first signal, the third signal having a second predetermined time delay relative to the first signal, the second predetermined time delay characteristic of a second interference signal expected to be received by the receiver chain, wherein the second predetermined time delay is different to the first predetermined time delay and wherein the receiver chain is configured to use the third signal to provide for cancelling of the second interference signal in the received signal.

10. The transceiver of claim 9 wherein the interference cancellation block is configured to provide the third signal a second predetermined attenuated amplitude with respect to the amplitude of the first signal, wherein the second predetermined amplitude is characteristic of the second interference signal expected to be received by the receiver chain.

11. The transceiver of claim 9, wherein the receiver chain includes another analog signal mixer configured to mix the second interference signal with the received signal to thereby provide for cancelling of the second interference signal in the received signal.

12. The transceiver of claim 9, wherein the interference cancellation block further comprises an integrated circuit configured to combine the second signal and the third signal such that cancelling of the interference signal and the second interference signal is provided for by another analog signal mixer.

13. The transceiver of claim 1, wherein the transceiver comprises a plurality of transmitter chains, a corresponding plurality of interference cancellation blocks and a corresponding plurality of receiver chains, each transmitter chain configured to generate a transmission signal having an orthogonal digital signal to the transmission signals generated by the other transmitter chains, the transceiver thereby providing for a multi-in multi-out system.

14. A method of cancelling an interference signal for a detection and ranging system comprising:
   generating a first signal based on a digital sequence, the first signal for mixing with a carrier signal to provide a transmission signal;
   generating a second signal based on the same digital sequence used to generate the first signal, the second signal having a predetermined time delay relative to the first signal wherein the predetermined time delay is characteristic of an interference signal expected to be received by the detection and ranging system;

receiving a received signal for detection and ranging, the received signal having components comprising at least none, one, or more reflections of the transmission signal and a component comprising the interference signal; and providing an output signal by mixing the received signal and the second signal thereby cancelling the interference signal in the received signal.

15. The method of claim 14, further comprising:

generating by way of a carrier signal generator the carrier signal; and mixing the first signal with the carrier signal by way of a second analog signal mixer to provide the transmission signal.

16. The method of claim 14, wherein the receiver chain comprises a track and hold amplifier and an analog to digital converter, the analog to digital converter downstream of the track and hold amplifier, the track and hold amplifier and the analog to digital converter arranged downstream of the first analog signal mixer and configured to digitize the output signal of the first analog signal mixer.

17. The method of claim 16, further comprising averaging the output signal after digitization of the output signal by way of a coherent adder.

18. The method of claim 14, further comprising modulating the carrier signal by at least one of phase, frequency, and amplitude modulation based on the digital sequence of the first signal.

19. The method of claim 14, wherein the transceiver comprises a plurality of transmitter chains, a corresponding plurality of interference cancellation blocks and a corresponding plurality of receiver chains, each transmitter chain generating a transmission signal having an orthogonal digital signal to the transmission signals generated by the other transmitter chains, the transceiver thereby providing for a multi-in multi-out system.

20. An automotive radar system comprising a transceiver for a detection and ranging, the transceiver comprising:

a transmitter chain comprising a first sequence generator configured to generate a first signal based on a digital sequence, the first signal for mixing with a carrier signal to provide a transmission signal;

an interference cancellation block comprising a second sequence generator configured to generate a second signal based on the same digital sequence used to generate the first signal, the second signal having a predetermined time delay relative to the first signal wherein the predetermined time delay is characteristic of an interference signal expected to be received by a receiver chain of the transceiver; and the receiver chain configured to receive a received signal for detection and ranging, the received signal having components comprising at least none, one, or more reflections of the transmission signal and a component comprising the interference signal, the receiver chain comprising a first analog signal mixer configured to provide an output signal by mixing the received signal and the second signal thereby cancelling the interference signal in the received signal.

* * * * *